(12) United States Patent
Groh et al.

(10) Patent No.: US 7,644,685 B2
(45) Date of Patent: Jan. 12, 2010

(54) UNITIZED RECEIVER-HOUSING BEARING COLLAR FOR PET

(75) Inventors: William S. Groh, Knoxville, TN (US); Albert L. Lee, IV, Seymour, TN (US)

(73) Assignee: Radio Systems Corporation, Knoxville, TN (US)

( * ) Notice: Subject to any disclaimer, the term of this patent is extended or adjusted under 35 U.S.C. 154(b) by 217 days.

(21) Appl. No.: 11/373,016

(22) Filed: Mar. 10, 2006

(65) Prior Publication Data

US 2007/0209604 A1    Sep. 13, 2007

(51) Int. Cl.
*A01K 27/00*    (2006.01)
(52) U.S. Cl. .................................... 119/856; 119/859
(58) Field of Classification Search .............. 119/718, 119/760, 765, 862, 761, 767, 775, 860, 856–859
See application file for complete search history.

(56) References Cited

U.S. PATENT DOCUMENTS

| | | | | |
|---|---|---|---|---|
| 6,131,535 A | * | 10/2000 | So | 119/719 |
| D439,708 S | * | 3/2001 | Jenkins | D30/152 |
| 6,588,376 B1 | * | 7/2003 | Groh | 119/860 |
| 7,249,572 B2 | * | 7/2007 | Goetzl | 119/859 |
| 7,382,328 B2 | * | 6/2008 | Lee et al. | 343/718 |

* cited by examiner

*Primary Examiner*—Kimberly S Smith
(74) *Attorney, Agent, or Firm*—Pitts & Brittian, P.C.

(57) ABSTRACT

A unitized receiver-housing bearing planar collar for a pet wherein the bottom end of the receiver housing is integrally formed with the collar, the bottom perimetrical edge of the receiver housing being oriented substantially parallel to the plane of the collar. The collar is overmolded, free of independent connectors or fasteners, on the receiver housing adjacent the bottom end of the receiver housing such that when the collar is affixed to the neck of a pet, for example, there is established and maintained a pre-selected orientation of the receiver housing relative to the pet.

17 Claims, 4 Drawing Sheets

UNITIZED RECEIVER-HOUSING BEARING COLLAR FOR PET

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The invention relates to pet collars having electronic devices associated therewith.

2. Description of the Related Art

Collars for pets, particularly dogs and cats, commonly are of at least two types. A first type includes some type of electronic device useful in transferring a radio frequency signal from a remote transmitter to the pet in the form of a mild electrical shock. Such devices are useful in training pets and in electronic containment systems wherein a pet's physical roaming territory is defined by a buried conductor, remote transmitter or the like, carrying a signal which is transmitted to a pet upon the pet approaching the boundary of a containment area established by a transmitted signal. It is imperative for proper operation of the electronic device carried by the pet that it be positioned precisely on, and in good electrical communication with, the pet, usually on the pet's neck, for the effective receipt of a signal from a remote location, and proper transfer of the received signal to the pet in the form of a mild electronic shock. Effective receipt of a signal (shock) by the pet is commonly accomplished through the use of two electrodes which project from the receiver housing and which need to be in good continuous engagement with the outer skin of the pet.

Heretofore, the electronic device includes a receiver housing attached to the collar by conventional fastener hardware, i.e., screws, nuts and bolts, and the like. These fasteners tend to loosen over time, causing the electronic device to lose its desired position on the pet, or for the electronic device to completely fall away from the collar. Moreover, the use of mechanical fasteners commonly requires large size receiver housings, even though such large size is not needed for containing the electronics employed, thereby contributing to the problem of retention of the receiver housing in proper position on the pet, and the overall cost of the receiver.

In a second type of pet collar, there is provided some type of housing mounted on a collar designed to encircle the neck of the pet. The housing or some like member serves, among other things, as the mounting location for a dispenser of a fluid or gas which is obnoxious to the pet. The fluid most commonly is sprayed from a reservoir in the housing onto or in near proximity to some selected anatomical feature of the pet, such as the nose of the pet. In this type housing/collar combination, it is important that the orientation of the housing on the collar, hence the orientation of the dispenser member, to the selected anatomical feature of the pet, be initially established and thereafter maintained constant at all times so that the dispensed material will reach the desired anatomical feature of the pet. Thus, in this type housing/collar device, rigidity of the fixation of the housing to the collar as well as rigidity of fixation of the housing to the pet via the collar, is of importance in ensuring the desired directional delivery of the dispensed material. In this type device, selected times and time periods of dispensing of the material toward the pet are commonly controlled by radio frequency signals directed to electronics within the housing from a remote location, or electronics held within the housing which are sensitive to an external activating action, such as the barking of a dog, or the like.

BRIEF SUMMARY OF THE INVENTION

In accordance with one aspect of the present invention, there is provided an electronic device, usually a radio frequency receiver or a transceiver which can both send and receive radio frequency or electrical signals or other signal such as the sound of a barking dog (the term "receiver" being deemed to be generic of these type devices for purposes of clarity in the present application), comprising a receiver housing having an end or outer circumferential side surface which is integrally formed with a mid-portion of a planar collar adapted to encircle a pet's neck and position the electrodes of the electronic device in simultaneous engagement with the pet's outer skin. The present unitized receiver-housing bearing collar lies flat against the animal's skin and positions that end of the receiver housing (i.e., bottom) which carries the electrodes, and to which the collar is integrated, oriented substantially coplanar and in intimate electrically communicative relationship with the pet's skin to provide effective electronic communication between the receiver and the pet. This same positioning and orientation of the housing is similarly of importance in those housing/collar combinations which serve to mount and maintain a fluid dispenser or the like in a selected orientation relative to some anatomical feature of the pet.

The present invention also is useful in other applications, such as opening or closing of the door of a pet enclosure, entryway to and from a house door, activation of a drinking fountain upon the approach of the pet to the fountain and like applications. In certain of these applications, there is communication between the receiver and the object to be activated, as opposed to the application of an electrical shock to the pet itself.

In one aspect of the present invention, the integration of the receiver and the collar is free of independent fasteners or connectors, has no sharp corners to annoy or irritate the pet, and provides the rigidity and solidity needed for retention of the desired orientation of the receiver housing relative to the pet's skin. In one embodiment, the integration of the receiver housing and collar is effected by overmolding techniques.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

With reference to the several Figures, wherein there is depicted one embodiment of the present unitized receiver-housing bearing collar 10 is described.

Figure 1:
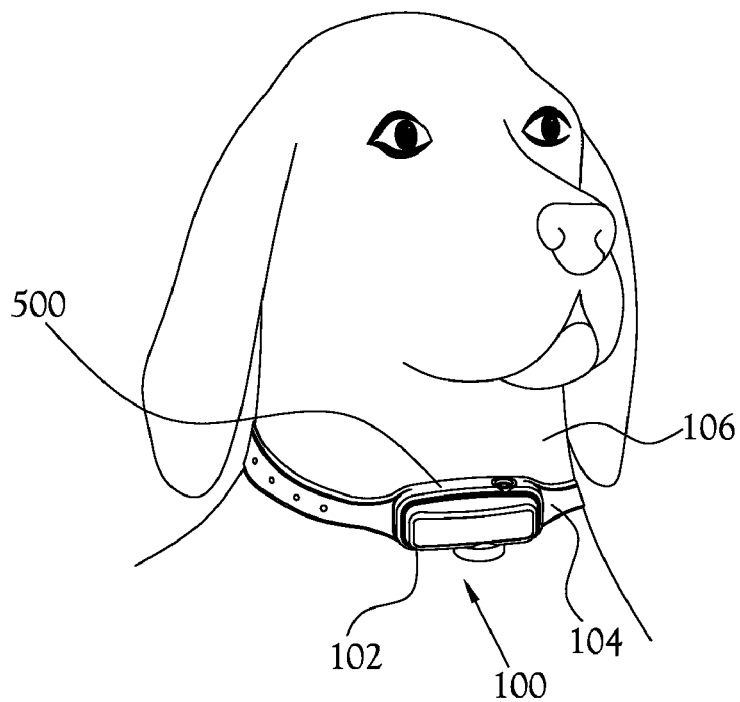
FIG. 1 depicts a pet having a unitized collar and housing of the present invention mounted about the neck of the pet.

FIG. 1 illustrates one embodiment of the unitized receiver-housing bearing collar 100 having a receiver housing 102 adapted to receive therein known electronics for receiving a signal, commonly a radio frequency signal or an audible signal, from a remote source and for transmitting a mild electrical shock to the skin of a pet 106 on which the collar 104 is disposed, in a manner known in the art.

Figure 2:
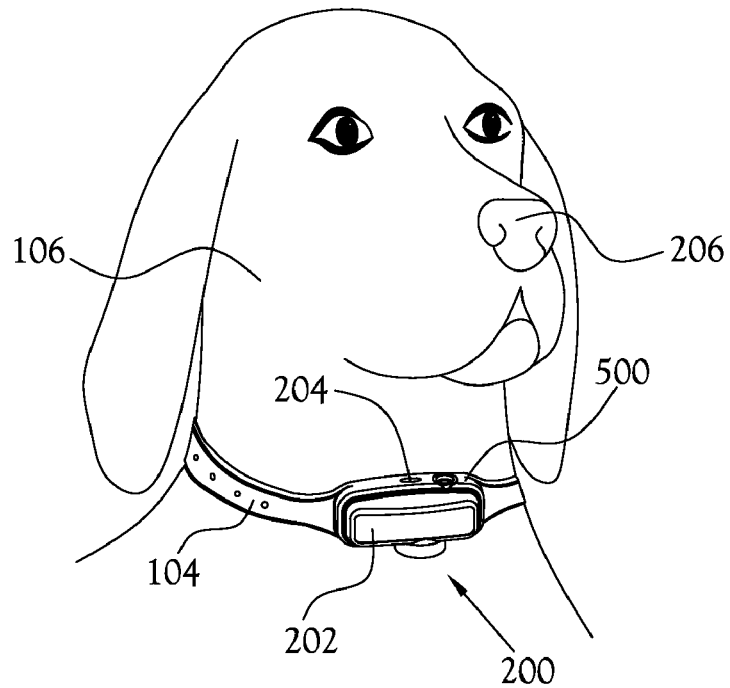
FIG. 2 depicts a pet having a unitized collar and housing of the present invention as employed to dispense a distasteful fluid toward a selected anatomical feature of the pet.

FIG. 2 illustrates another embodiment of the unitized receiver-housing bearing collar 200. As is known in the art, the housing 202 is fitted with a fluid dispenser 204 whose orientation relative to an anatomical feature 206, e.g., the nose, of the pet 106 is established and maintained by the orientation of the receiver housing 202, which in turn, is affixed to the neck of the pet 106. Other applications will be recognized by one skilled in the art, including differing types of training/containment/access applications, differing types of corrections, and differing places of attachment to the pet.

Figure 3:
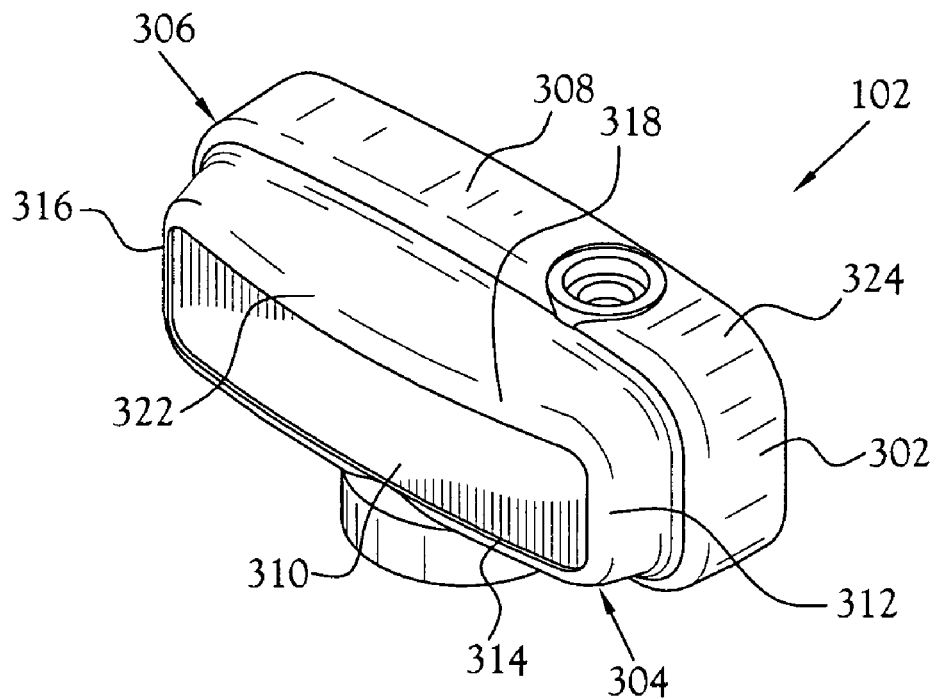
FIG. 3 is a front perspective view of the receiver housing depicting various features of the invention.

FIG. 3 is a perspective view of the housing 102 prior to unitization with the collar 104. In the present depicted embodiment, the housing 102 includes a first side wall 302, a second side wall 304, a third side wall 306, and a fourth side wall 308, each having a front edge 312, 314, 316, 318. A front wall 310 extends from the front edges 312, 314, 316, 318 of the side walls 302, 304, 306, 308 to substantially define a housing 102 closed on five sides. In the illustrated embodiment, the front wall is recessed slightly from the front edges 312, 314, 316, 318 or alternatively, the side walls 302, 304, 306, 308 extend above and form a lip around the front wall 310. As illustrated, the front wall 310 is integrally molded as part of the housing 102; however, one skill in the art will recognize that the top wall 310 can be formed as an insert that is permanently affixed to the side walls 302, 304, 306, 308 proximate to the front edges 312, 314, 316, 318. By making the front wall 310 separately, the face of the housing can be varied for individual products to provide for features or simply aesthetic appearance.

It should be noted that the illustrated embodiment shows the side walls 302, 304, 306, 308 as being contoured with a line of demarcation 320 that delineates the sides walls 302, 304, 306, 308 into a forward portion 322 and a rearward portion 324 with the forward portion 322 having a smaller perimeter than the reward portion 324. One skilled in the art will recognize that exterior contour can vary for functional or aesthetic reasons without departing from the scope and spirit of the present invention.

Figure 4:
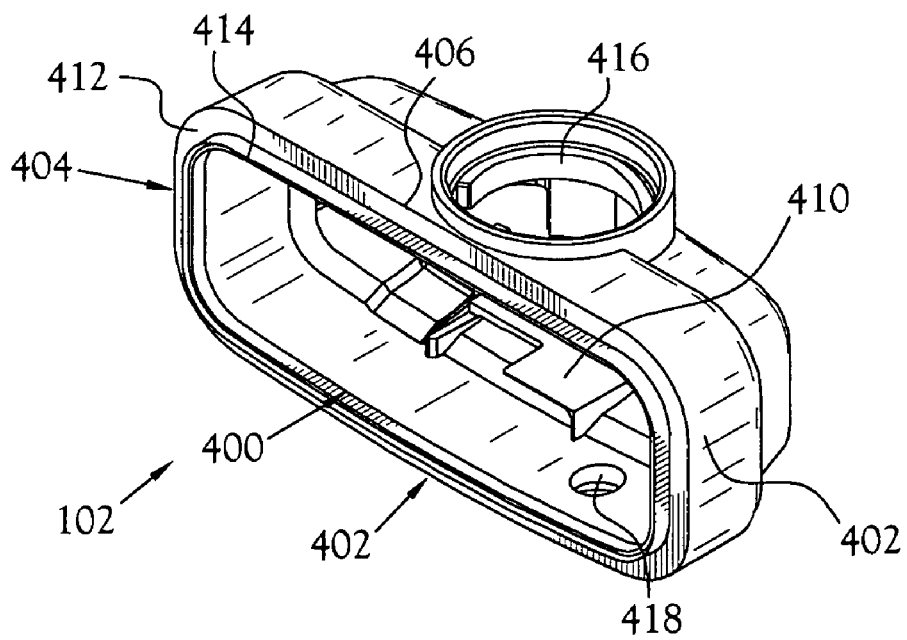
FIG. 4 is a rear perspective view of the receiver housing depicting various features of the invention.

FIG. 4 illustrates a perspective view of the housing 102 rotated 180° about its longitudinal axis. The bottom edges 402, 404, 406, 408 of the side walls 302, 304, 306, 308, collectively define a perimetrical edge 400 of the housing 102. The perimetrical edge 400, in turn, defines the boundary of the open face of the housing 102. Visible within the interior of the housing 102 is a mounting plate 410 which provides a mounting location for the electronic circuitry providing the unit with whatever functionality is desired.

The bottom edges 402, 404, 406, 408 collectively define a shoulder 412. Extending from and proximate to the inner surfaces of the side walls 302, 304, 306, 308 is a lip 414. Together the shoulder 412 and the lip 414 provide surfaces against which a cover may engage the housing and be sealed thereto.

Two other features of the housing 102 are the battery access port 416 and the switch port 418. The battery access port 416 provides access via a sealable entry into the housing for replacing a spent power source. The switch port 418 provides pass-through that allows inclusion of a switch, button, or other interface that can be manipulated from the outside of the housing 102.

Figure 5:
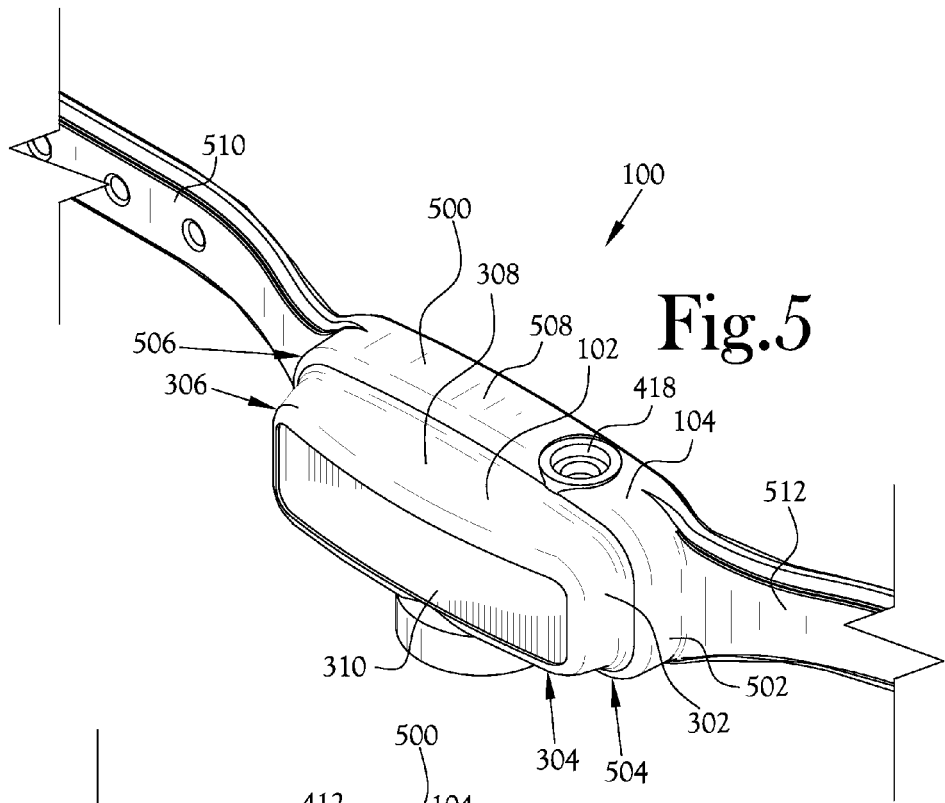
FIG. 5 is a front perspective view of one embodiment of a unitized receiver-housing bearing collar depicting various features of the invention.

FIG. 5 illustrates the complete unitized receiver-housing bearing collar 100 with the collar 104 attached to the housing 102. In the illustrated embodiment, the collar 104 includes a pair of planar elongated members 510, 512 extending from a band 500. The band 500 has a first side 502, a second side 504, a third side 506, and a fourth side 508. The band 500 encircles the housing 102 and is permanently affixed thereto for the purpose of unitizing the housing 102 and the collar 104. The pair of planar elongated members 510, 512 is substantially orthogonal to said band 500.

Figure 6:
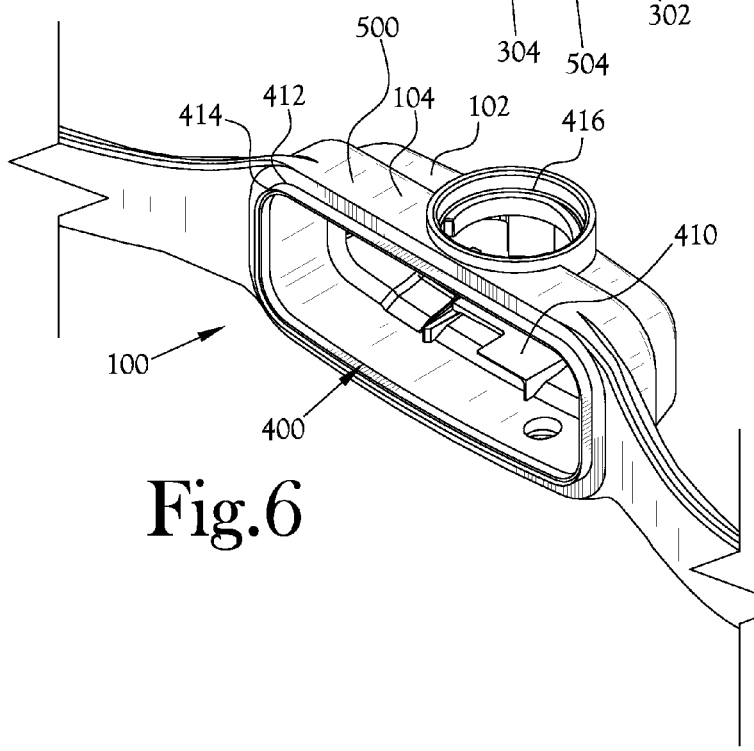
FIG. 6 is a rear perspective view of one embodiment of a unitized receiver-housing bearing collar depicting various features of the invention.

In one embodiment, the unitized receiver-housing bearing collar 100 is fabricated by overmolding the collar 104 onto the housing 102 such that the sides 502, 504, 506, 508 of the band 500 engage at least a portion of the corresponding side walls 502, 504, 506, 508 of the housing 102 proximate to the perimetrical edge 400. In other embodiments, the bond between the collar 104 and the housing 102 is created through heat, chemical reaction, or a combination of heat and chemical reaction. In still further embodiments, the bond between the collar 104 and the housing 102 is generated through the use of adhesives or solvent welds. In the illustrated embodiment, the band is overmolded onto the bottom outer circumferential surface of the housing 102. FIG. 6 illustrates a perspective view of the housing 102 rotated 180° about its longitudinal axis.

Though the housing and the band are described to have a plurality of sides/walls consistent with the substantially rectangular shape illustrated, one skilled in the art will recognize that the number of sides/walls will vary with the shape of the housing and/or the band. For example, if the unitized receiver-housing bearing collar 100 is designed to have a substantially spherical shape, the front wall and the side walls are, in effect, one wall with no clear line of demarcation therebetween. It should be appreciated that the shape of the unitized receiver-housing bearing collar 100 can vary without departing from the scope and spirit of the present invention and, as such, the unitized receiver-housing bearing collar 100 should not be limited to any particular number of walls.

Figure 7:
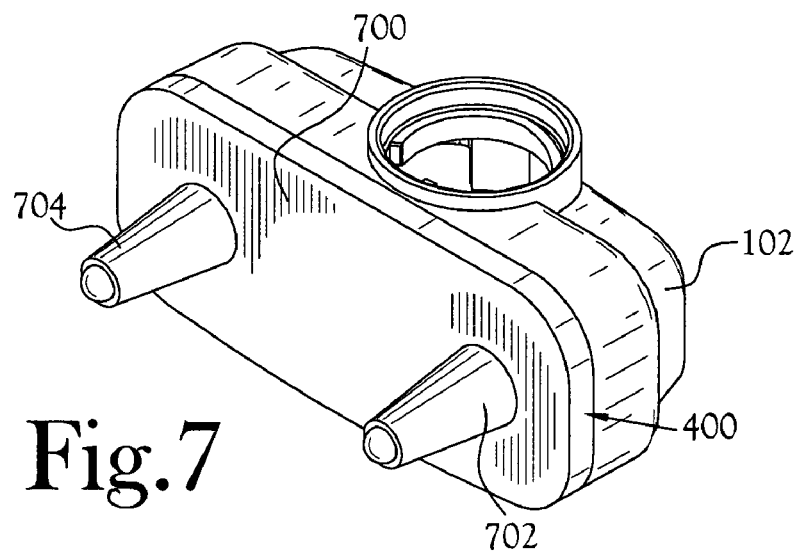
FIG. 7 is a rear perspective view of the receiver housing with one embodiment of an attached cover adapted for a training application using electrical correction.

FIG. 7 illustrates the completed housing 102 where the open end of the housing 102 is closed by one embodiment of a bottom wall 700, or cover, which is sealed, preferably hermetically, along the bottom perimetrical edge 400 of the housing 102. As previously discussed, the cover 700 engages and is sealed to the shoulder 412 and the lip 414 of the housing 102. In this embodiment, a pair of electrodes 702, 704 project substantially perpendicularly away from the bottom wall 700, thereby being in position to engage the outer skin of a pet 106 when the receiver-housing bearing collar 100 encircles the neck of the pet 106. In one embodiment the electrodes are conventional stimulus electrodes. In an alternate embodiment, at least one of the electrodes is a combination vibration sensor and stimulus electrode, or sensor electrode.

Figure 8:
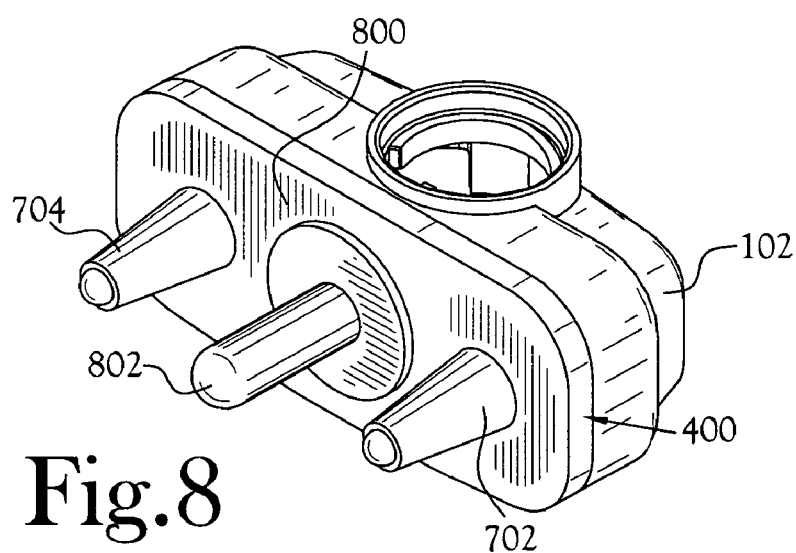
FIG. 8 is a rear perspective view of the receiver housing with another embodiment of an attached cover adapted for a bark control application using electrical correction.

FIG. 8 illustrates the completed housing 102 where the open end of the housing 102 is closed by another embodiment of a bottom wall 800, or cover. This embodiment of the cover 800 includes the pair of electrodes 702, 704 shown in FIG. 7 and adds a sensor probe 802, such as a vibration sensing probe, located in between the pair of electrodes 702, 704 for a bark control collar application.

Figure 9:
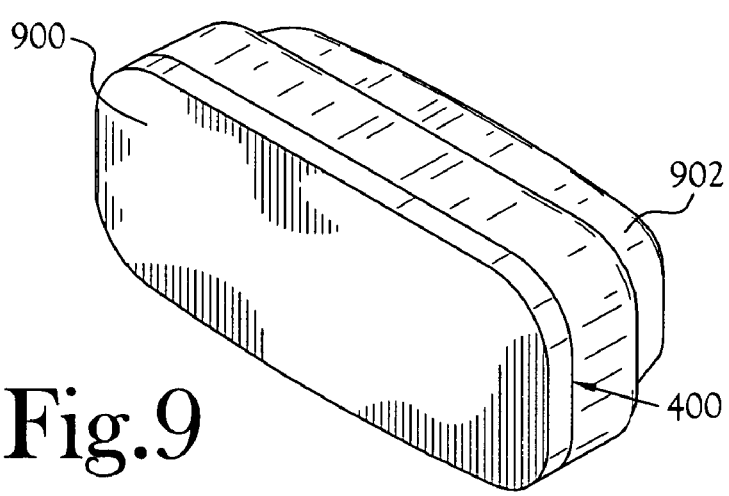
FIG. 9 is a rear perspective view of the receiver housing with another embodiment of an attached featureless cover adapted for a pet access application or training using a non-electrical correction such as vibration or a spray deterrent.

FIG. 9 illustrates the completed housing 902 where the open end of the housing 102 is closed by another embodiment of a bottom wall 900, or cover. This embodiment of the cover 900 is substantially featureless having no exterior protrusions. This cover 900 is useful for pet access applications where the housing carries a magnet, a transmitter, a receiver, a transceiver, or similar device that communicates with a remote lock system for pet access to a portal or a feeding dish. Further, this cover is appropriate where the stimulation of the pet 106 is accomplished by something other than an electrical stimulation. Examples of non-electrical stimulations include vibrations produced a motor or oscillator carried within the housing 102 or a spray deterrent. In this instance, the featureless cover 900 serves as an aid in alignment of the housing 102 substantially coplanar with the outer skin of the pet 106 enhancing the orientation of a fluid dispensing outlet relative to a selected anatomical feature of the pet.

In addition, FIG. 9 illustrates a housing 902 without any access ports thereby reducing the number of potential avenues for water intrusion. The lack of access ports is appropriate when the housing 902 carries non-powered equipment such as a magnet.

In a preferred embodiment, the housing 102 and the collar 104 are each formed from a polymeric material. In this embodiment, integration of the collar 104 and the housing 102 comprises overmolding the collar 104 onto the face of the housing 102. When so constructed, the plane of the bottom perimetrical edge 400 of the housing 102 and the plane of the collar 104 are established substantially parallel to one another. The overmolding procedure eliminates the need for mechanical fastening hardware for affixing the housing 102 to the collar 104, hence permitting the use of a smaller size housing 102. Through the reduction in size and/or the elimination of the need for fastening hardware the overall cost of the unitized receiver-housing bearing collar 100 can be reduced and any annoyance to the pet occasioned by the presence of the collar/housing combination about its neck can be minimized. Importantly, the overmolding procedure unitizes the housing 102 and the collar 104 to the extent that separation of these two elements is only effected through the application of a destructive force or forces against the collar and/or housing, i.e., a force or force which would render the collar/housing combination unusable. Notably, the integration is free of independent fasteners or connectors such as mechanical fasteners, and has no sharp edges which might annoy or irritate the pet 106 when the present invention is placed about the neck of the pet.

Moreover, location of the integration area adjacent the bottom edges 402, 404, 406, 408 of the housing side walls 302, 304, 306, 308 and the planar parallelism of the perimetrical edge 400 of the housing 102 and the collar 104 permits the perimetrical edge 400 of the housing 102 to be positioned substantially parallel with the pet's skin when the collar 104 is disposed in encircling relationship to the neck of the pet 106. Retention of this relationship between the housing 102 and the skin of the pet's neck is enhanced by effecting the integration of the housing 102 and the collar 104 at a location adjacent the bottom edges 402, 404, 406, 408 of the housing 102 so that there is reduced tendency of the housing 102 to move from its desired substantially coplanar attitude relative to the pet's skin over time and under normal, or even abnormal, conditions of pet activity.

Additionally, in one embodiment of the present invention, the perimetrical edge 400 of the housing 102 projects beyond the collar 104. This structure provides for the perimetrical edge 400 of the housing to engage the skin of the pet 106 about substantially the entirety of the perimetrical edge 400 and aid in stabilization of the housing against tilt and/or yaw from its desired parallel relationship to the pet's skin. When so constructed, the present invention provides enhanced electrical communication between the electrodes 702, 704 and the pet 106, hence constant magnitude of the electrical shock which might be applied to the pet 106. This factor is of special importance when the receiver is designed to provide various degrees of electrical shock to the pet in an effort to obtain a desired action or reaction by the pet. For example, in training a pet, the magnitude and/or, frequency of application of an electrical shock to the pet may be designed to convey a specific incentive for the pet to perform a desired function or activity. Inconsistent transmission of the signal(s) to the pet can result in confusion by the pet as to what is expected by the trainer. In like manner, this stabilization of the receiver housing in the desired orientation of the receiver housing relative to the skin of the pet is useful when the housing is adapted to mount a fluid dispenser in a selected spatial relationship to a selected anatomical feature of the pet.

Inasmuch as overmolding commonly comprises injection molding of a thermoplastic elastomer over or around a compatible substrate using either insert or multishot processes, the housing of the present invention may be formed from a polymeric material such acrylonitrile-butadiene-styrene, nylon or other polymeric material suitable to form a substantially rigid receiver housing. Thus, the choice of polymeric materials for the collar element of the present invention may include such thermoplastics as polyethylene, for example.

In one embodiment of the present invention, in addition to the unifying of the receiver housing with the pet collar, the electronics disposed internally of the receiver housing may be further protected from anticipated harsh environments during use may be protected by encapsulating all or a selected portion of the electronics and/or by potting the hollow interior of the receiver housing. Encapsulating or potting further protects the electronics in the event of intrusion by the ambient environment external to the housing. Alternatively or in addition, the entire receiver housing and that portion of the pet collar to which the receiver housing is unified may be encapsulated. A large variety of encapsulants and potting materials and the methods for their use are well known in the art and include polyamide, polyamide-imide, polybutadiene, polycarbonate, polypropylene, polyurethane, silicone, vinyl and polyvinyl chloride. Epoxy resins exhibit high strength and low shrinkage during curing. Polymers are used widely and include liquid crystal polymer and polyolefin. Certain fluoropolymers provide superior chemical resistance.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A unitized receiver-housing bearing collar for a pet comprising:
   a housing comprising at least one wall, said at least one wall defining a perimetrical edge, an open bottom end proximate to said perimetrical edge, and a closed end of said housing opposite said open bottom end, said at least one wall having an outer circumferential surface; and
   a collar defining a band and at least a pair of elongated planar members, said band defining an opening and encircling solely said outer circumferential surface of said housing such that said housing is disposed within the opening, each of said at least a pair of elongated planar members extending substantially orthogonally from said band, said at least a pair of elongated planar members being adapted to encircle and engage a portion of a pet, said band being affixed to said outer circumferential surface of said housing in a manner which precludes separation of said housing and said collar without destructive force being applied thereto.

2. The unitized receiver-housing bearing collar of claim 1 wherein said at least one wall further comprises:
   at least one side wall having a front edge opposite of said perimetrical edge; and
   a front wall sealingly joined to said front edge of said at least one side wall.

3. The unitized receiver-housing bearing collar of claim 1 wherein said collar is overmolded upon said bottom outer circumferential surface of said housing.

4. The unitized receiver-housing bearing collar of claim 1 further comprising a bottom wall closing said bottom end of said housing.

5. The unitized receiver-housing bearing collar of claim 4 wherein said bottom wall is permanently affixed to said housing.

6. The unitized receiver-housing bearing collar of claim 4 further comprising a plurality of probes projecting outwardly from said bottom wall in position to engage a pet upon which said collar is affixed, each of said plurality of probes being selected from the group consisting of electrodes, sensor probes, and sensor electrodes.

7. The unitized receiver-housing bearing collar of claim 1 and including a fluid dispensing member affixed to said housing in operative relationship with a selected anatomical feature of the pet.

8. The unitized receiver-housing bearing collar of claim 1 wherein said collar is overmolded onto said housing and is separable only by the application to said housing or said collar of at least a destructive force which renders said unitized housing receiver-housing bearing collar thereafter unusable.

9. The unitized receiver-housing bearing collar of claim 8 wherein said housing is affixed to said collar without requiring use of independent fastening hardware.

10. The unitized receiver-housing bearing collar of claim 1 wherein said affixation of said housing to said collar comprises a bond selected from the group of bonds consisting of chemical generated bonds, heat generated bonds, solvent weld generated bonds, adhesive generated bonds, and combinations thereof which are separable only by the application to said housing or said collar of at least a destructive force which renders said unitized housing receiver-housing bearing collar thereafter unusable.

11. The unitized receiver-housing bearing collar of claim 1 wherein said housing has electronics mounted therein, said unitized receiver-housing bearing collar further comprising an encapsulant or potting material disposed within said housing and sealing the electronics disposed within said housing against the ambient environment external potentially intruding into said housing.

12. A unitized receiver-housing bearing collar for a pet or other animal, said unitized receiver-housing bearing collar comprising:
   a housing formed from a polymeric material, said housing comprising at least one wall having an outer circumferential surface, said at least one wall defining a perimetrical edge, an open bottom end of said housing proximate to said perimetrical edge, and a closed end of said housing opposite said open bottom end;
   a bottom wall covering and sealingly closing said open bottom end of said housing; and
   a collar formed of a flexible and resilient polymeric material, said collar defining a band and a pair of elongated planar members extending from the band, the band defines an opening and encircles solely the outer circumferential surface of said housing such that said housing is disposed within the opening, the elongated planar members being adapted to encircle a portion of a pet.

13. The unitized receiver-housing bearing collar of claim 12 wherein said housing has electronics mounted therein, said unitized receiver-housing bearing collar further comprising an encapsulant or potting material disposed within said housing and sealing the electronics disposed within said housing against the ambient environment external potentially intruding into said housing.

14. The unitized receiver-housing bearing collar of claim 12 wherein said at least one wall further comprises:
   at least one side wall having a front edge opposite of said perimetrical edge; and
   a front wall sealingly joined to said front edge of said at least one side wall.

15. The unitized receiver-housing bearing collar of claim 12 wherein said housing is affixed to said collar without requiring use of independent fastening hardware.

16. The unitized receiver-housing bearing collar of claim 12 further comprising a band substantially orthogonal to said pair of elongated planar members, said pair of elongated planar members extending from said band, said band circumscribing a portion of said housing, said band being permanently affixed to said outer circumferential surface of said housing.

17. The unitized receiver-housing bearing collar of claim 12 wherein said bottom wall is permanently affixed to said housing.

* * * * *